US006667714B1

(12) United States Patent
Solondz

(10) Patent No.: US 6,667,714 B1
(45) Date of Patent: Dec. 23, 2003

(54) DOWNTILT CONTROL FOR MULTIPLE ANTENNA ARRAYS

(75) Inventor: Max A. Solondz, Morris Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/564,094

(22) Filed: May 3, 2000

(51) Int. Cl.[7] .............................. H01Q 3/26; H04B 1/38
(52) U.S. Cl. ...................................... 342/368; 455/562.1
(58) Field of Search ................................. 342/372, 375, 342/354, 359; 343/777, 778, 853; 455/562

(56) References Cited

U.S. PATENT DOCUMENTS

| | | | | | |
|---|---|---|---|---|---|
| 2,968,808 A | * | 1/1961 | Russell | ........................ | 342/375 |
| 4,788,515 A | * | 11/1988 | Wong et al. | ................ | 333/160 |
| 5,798,675 A | * | 8/1998 | Drach | ........................ | 333/161 |
| 5,905,462 A | | 5/1999 | Hampel et al. | ............. | 342/372 |
| 5,917,455 A | * | 6/1999 | Huynh et al. | ............ | 343/792.5 |
| 5,940,030 A | | 8/1999 | Hampel et al. | ............. | 342/372 |
| 6,097,267 A | * | 8/2000 | Hampel | ....................... | 333/128 |
| 6,366,237 B1 | * | 4/2002 | Charles | ....................... | 342/368 |

FOREIGN PATENT DOCUMENTS

WO WO 96/14670 A1 * 5/1996 ............ H01Q/3/32

OTHER PUBLICATIONS

Zordan, L. et al, "Capacity Enhancement of Cellular Mobile Network Using a Dyanmic Electrical Down–tilting Antenna System", IEEE 50 th Vehicular Technology Conf., Sep. 1999, pp. 1915–1918, vol. 3.*

Yamada, Y et al, "A Multi–frequency Base Station Antenna for Complex Configurations", IEEE 50 th Vehicular Technology Conf., Sep. 1999, pp. 1336–1340, vol. 3.*

Strickland, P. et al, "Microstrip Base Station Antennas for Cellular Communications", 41st IEEE Vehicular Technology Conf., May 1991, pp. 166–171.*

* cited by examiner

*Primary Examiner*—Gregory C. Issing

(57) ABSTRACT

The downtilt angles of two (or more) variable-phase, phased-array antennas are simultaneously controlled by configuring each antenna with an integrated power-splitter/phase-shifter assembly that splits (and/or combines) power and shifts phase for signals transmitted (and/or received) by the antenna. Movable components in each of the integrated power-splitter/phase-shifter assemblies are connected to a common linkage, which is in turn configured to a common motor, which is controlled by a controller. Motion of the common motor is translated (e.g., by one or more gear boxes) into motion of the linkage, which moves the components within the integrated assemblies, thereby changing the electro-magnetic characteristics of a (e.g., microstrip) conductor within each integrated assembly to control the amount of phase shift applied to the signals. In one implementation, the movable components in the integrated assemblies are dielectric wedges that are sandwiched between the microstrip conductor and a ground plane, where movement of the wedges between the microstrip conductor and the ground plane changes the phase-shift angle applied to signals at that position along the microstrip conductor. The present invention is especially suitable for the separate uplink and downlink antenna arrays used in base stations of wireless communication networks.

13 Claims, 6 Drawing Sheets

DOWNTILT CONTROL FOR MULTIPLE ANTENNA ARRAYS

BACKGROUND OF THE INVENTION

1. Field of the Invention

The present invention is related to techniques for controlling the downtilt angle of phased-array antennas, such as those used in the base stations of wireless communication networks.

2. Description of the Related Art

In a conventional wireless communication network, communications with wireless units (e.g., mobile telephones) are supported by base stations, each configured with one or more antennas that provide communication coverage over an area surrounding the base station referred to as the base station cell. A typical base station cell may be divided into (e.g., three) sectors, with different antennas configured to support communications for the different sectors. In order to provide a relatively large cell size, base station antennas are typically configured at a higher height (e.g., on the tops of transmission towers) than the wireless units located within that cell. In order to communicate with wireless units located anywhere within a base station cell, including right next to the base station itself, base station antennas are typically configured with a downtilt angle to "point" the antennas down to provide the appropriate coverage.

One way to configure an antenna with a downtilt angle is to physically mount the antenna pointing at an angle below horizontal. Another way to achieve a downtilt angle is to use a phased-array antenna that can be pointed "electrically" by selecting appropriate phase shifts at the various antenna elements in the array.

FIG. 1 shows a block diagram of a conventional N-element, parallel-fed, fixed-phase, phased-array antenna 100. Antenna 100 comprises a power splitter 102, N phase shifters 104, each phase shifter configured with a corresponding antenna element 106, where the N phase shifters 104 are configured in parallel to power splitter 102. Power splitter 102 receives an RF signal and distributes that RF signal to the N phase shifters 104 (e.g., splitting the signal power equally or in a shaped (e.g., cosine) manner among the different phase shifters). Each phase shifter $\mathbf{104}_i$ shifts the phase of its received portion of the RF signal by a particular fixed phase-shift angle $\phi_i$ and passes the resulting phase-shifted RF signal to its corresponding antenna element $\mathbf{106}_i$, which radiates that phase-shifted portion of the RF signal as a wireless electromagnetic (E-M) signal.

If the phase-shift angles $\phi$ at the N phase shifters 104 are selected appropriately, the resulting composite radiated E-M signal from the entire antenna array will form a uniform wavefront that propagates in a particular direction. As depicted in FIG. 1, to achieve a particular downtilt angle $\alpha$, the element array of antenna 100 is configured with a progressive phase shift such that the phase-shift angle $\phi_i$ applied by each phase shifter $\mathbf{104}_i$ increases linearly from the first phase shifter $\mathbf{104}_1$ through the $N^{th}$ phase shifter $\mathbf{104}_N$.

In general, the greater the number of antenna elements in the array, the more accurately and well-defined can be the coverage area (or footprint) of the antenna. This can be very important, especially in applications such as wireless communication systems, where base stations need to be distributed over a geographic area and configured with antennas that provide precise antenna footprints to ensure complete coverage over that geographic area with some overlap in adjacent antenna footprints to support handoffs for mobile wireless units, yet not with too much overlap in order to avoid undesirable interference between the signals of different wireless units.

Although FIG. 1 shows antenna 100 configured to transmit RF signals, antenna 100 can also be configured to receive RF signals, either at the same time as, or instead of, being configured to transmit RF signals, in which case, power splitter 102 (also) functions as a power combiner.

For relatively large downtilt angles and large arrays (e.g., more than four elements), the phase-shift angle $\phi_i$ for the last few phase shifters $\mathbf{104}_i$, where i=N, N−1, . . . , can become very large. This is not a problem for fixed-angle arrays. However, since the heights of base station antennas may vary from cell to cell, and the sizes of cells may vary from base station to base station, the magnitude of the downtilt angle will also typically vary from cell to cell. Moreover, the desired antenna footprint for a particular base station antenna may also vary over time, for example, as more base stations are configured within an existing covered geographic area. As such, it is not always practical to design base station antenna arrays with a fixed downtilt angle.

FIG. 2 shows a block diagram of a conventional N-element, parallel-fed, variable-phase, phased-array antenna 200. Like antenna 100 of FIG. 1, antenna 200 comprises a power splitter 202, N phase shifters 204, each with a corresponding antenna element 206, where the N phase shifters 204 are configured in parallel to power splitter 202. In antenna 200, however, the N phase shifters 204 are configured as part of a phase-shifter assembly 208, which is configured to a motor 210, which is in turn configured to a controller 212.

Controller 212 receives phase control signals that determine how to control the operations of motor 210, which in turn drives phase-shifter assembly 208. Phase-shifter assembly 208 is typically a mechanical device with movable components (as driven by motor 210) whose movements affect the electro-magnetic characteristics (e.g., line length) of the various phase shifters 204 to change the magnitude of the phase-shift angle $\phi_i$ applied by each phase shifter $\mathbf{204}_i$ in a controlled manner.

Because the downtilt angle can be varied in a controllable manner, a single antenna design can be used for different base stations having different antenna heights that require different and varying downtilt angles. One advantage of parallel-fed, variable-phase antennas, such as antenna 200, is that they can be implemented with minimum insertion phase (i.e., phase difference) between adjacent antenna elements. For example, if the progressive phase shift needs to be 17 degrees in order to achieve a downtilt angle $\alpha$ of 4 degrees, then this can be achieved using parallel-fed phase shifters, where the difference in phase-shift angle $\phi$ between adjacent antenna elements $\mathbf{206}_i$ and $\mathbf{206}_{i+1}$ is simply $(\phi_{i+1}-\phi_i)=17°$.

Because the insertion phase can be minimized, parallel-fed, phased-array antennas can have relatively wide bandwidths. Typical wireless communication networks use different frequency bands for uplink (i.e., wireless unit to base station) and downlink (i.e., base station to wireless unit) communications. If the bandwidth of parallel-fed, phased-array antennas can be large enough, a single antenna array may be able to support both the uplink and downlink frequency bands. In that case, a single phased-array antenna can be used to both transmit downlink signals to the wireless units and receive uplink signals from the wireless units.

Unfortunately, for large ranges in downtilt angle (e.g., greater than 4 degrees) and large arrays (e.g., more than eight elements), the last few phase shifters (e.g., $204_N$, $204_{N-1}$, . . .) of parallel-fed antenna 200 can become impractical to realize, because those phase shifters must be able to provide a relatively large range of phase-shift angles $\phi$ (e.g., from as small as 0 degrees for a zero downtilt angle to as large as 180 degrees for a downtilt angle of 4 degrees). In order to avoid this problem, series-fed phased-array antennas are typically used.

FIG. 3 shows a block diagram of a conventional N-element, series-fed, variable-phase, phased-array antenna 300. Like antenna 200 of FIG. 2, antenna 300 comprises a power splitter 302, a phase-shifter assembly 308 with N phase shifters 304, each with a corresponding antenna element 306, a motor 310 that drives phase-shifter assembly 308 and a controller 312 that controls motor 310. Unlike antenna 200, however, the N phase shifters 304 in phase-shifter assembly 308 are configured in series with (N−1) power couplers 314 within a power-splitter assembly 302. As indicated in FIG. 3, the outgoing RF signal received by power-splitter assembly 302 is split by the first coupler $314_1$ into two RF signals: one of which is phase-shifted by the first phase shifter $304_1$ by a phase-shift angle $\phi_1$ for radiation by the first antenna element $306_1$ and the other of which is transmitted to the second phase shifter $304_2$, which applies a phase-shift angle $\phi_2$. In a typical implementation where phase-shift angle $\phi_1$ is always zero, phase shifter $304_1$ can be omitted. The phase-shifted RF signal from phase shifter $304_2$ is then further split by the second coupler $314_2$ into two RF signals: one of which is transmitted by the second antenna element $306_2$ and the other of which is transmitted to the third phase shifter $304_3$, which applies a further phase-shift angle $\phi_3$ to the already phase-shifted RF signal. The phase-shifted RF signal from phase shifter $304_3$ is then further split by the third coupler $314_3$ into two RF signals: one of which is transmitted by the third antenna element $306_3$ and the other of which is transmitted to the fourth phase shifter (not shown), which applies a fourth phase-shift angle $\phi_4$ to the twice phase-shifted RF signal. Since phase-shift angles are additive, the RF signal radiated by the third antenna element $306_3$ has a total phase shift equal to the sum of the phase-shift angles applied by the second and third phase shifters $304_2$ and $304_3$ or $(\phi_2+\phi_3)$.

Similar power splitting and phase shifting is repeated for each antenna element until the last coupler $314_{N-1}$ is reached. Coupler $314_{N-1}$ splits its received RF signal into two RF signals: one of which is transmitted by antenna element $306_{N-1}$ with a total phase shift of $(\phi_2+\phi_3+\ldots+\phi_{N-1})$ and the other of which is transmitted to the last phase shifter $304_N$, which applies a final phase-shift angle $\phi_N$ to the already multiply phase-shifted RF signal before passing the resulting RF signal to the last antenna element $306_N$, whose radiated signal has a total phase shift of $(\phi_2+\phi_3+\ldots+\phi_{N-1}+\phi_N)$.

Because the various phase shifters 304 and power couplers 314 are configured in series (rather than in parallel as in antennas 100 and 200) and since phase shifts are additive, each preceding phase shifter in the series only needs to apply a fraction of the overall phase shift for each antenna element 306 to achieve the desired progressive phase shift for the overall antenna array. As a result, a series-fed, variable-phase, phased-array antenna such as antenna 300 can be designed to provide a wide range of downtilt angles, since each phase shifter needs only to provide a fraction of the overall phase range and is therefore more easily realized.

Unfortunately, however, series-fed antenna designs often do not provide minimum insertion phase. For example, to achieve a progressive phase shift of 17 degrees over an antenna array, the difference in phase shift $\phi$ between adjacent antenna elements $306_i$ and $306_{i+1}$ may be $(\phi_{i+1}-\phi_i)=377°$, where excess phase in the design is padded by 360 degrees. Over the size of the array, this larger insertion phase makes the phase change rate vary faster as a function of frequency, thereby making the array more narrow in bandwidth. For large arrays (e.g., six elements or more), it is very difficult to achieve a bandwidth wide enough to cover both the uplink and downlink frequency bands for conventional wireless communication networks. As a result, two separate antenna arrays may be needed to support communications between a base station and the corresponding wireless units, with one antenna array designed for the uplink frequency band and the other antenna array designed for the downlink frequency band. In order to support both the uplink and the downlink communications for each wireless unit, the footprints of these uplink and downlink antenna arrays need to be the same and, as a result, their respective downtilt angles need to be able to be coordinated to achieve such common coverage areas.

SUMMARY OF THE INVENTION

The present invention is directed to an apparatus for simultaneously controlling the downtilt angles of two (or more) different variable-phase phased-array antennas, such as those used for uplink and downlink communications at a base station of a wireless communication network. Because the uplink and downlink frequency bands in typical wireless communication networks are different, for a common downtilt angle, the progressive phase shifts will be different for the uplink and downlink antennas. The present invention preferably takes those differences into account to achieve coordinated control over downtilt angle for the two different antenna arrays.

In one embodiment, the present invention is an apparatus for simultaneously controlling downtilt angles of two or more arrays of antenna elements, comprising (a) for each array, a power splitter and a phase-shifter assembly configured to control the progressive phase shifts between successive elements in the array; (b) a common linkage connected to one or more movable components of each phase-shifter assembly; (c) a common motor configured to the linkage to convert motion of the common motor into motion of the linkage; and (d) a controller configured to control the motion of the common motor, wherein the motion of the common motor causes the motion of the linkage which simultaneously moves the one or more components within each phase-shifter assembly to change the progressive phase shifts between successive elements in the corresponding array, thereby simultaneously changing the downtilt angles of the two or more arrays in a coordinated fashion.

In another embodiment, the present invention is an antenna system for a base station of a wireless communication network, comprising (a) an uplink array of antenna elements; (b) a downlink array of antenna elements; (c) an uplink power-combiner and an uplink phase-shifter assembly configured to control progressive phase shifts between successive array elements in the uplink array; (d) a downlink power-splitter and a downlink phase-shifter assembly configured to control progressive phase shifts between successive array elements in the downlink array; (e) a common linkage connected to one or more movable components of both the uplink and downlink phase-shifter assemblies; (f) a common motor configured to the linkage to convert motion of the common motor into motion of the linkage; and (g) a controller configured to control the motion of the common motor, wherein the motion of the common motor causes the motion of the linkage which simultaneously moves the one or more components within the uplink and downlink power-splitter/phase-shifter assemblies to simultaneously change the progressive phase shifts between successive elements in the uplink and downlink arrays, thereby simultaneously changing the downtilt angles of the uplink and downlink arrays in a coordinated fashion.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 4:
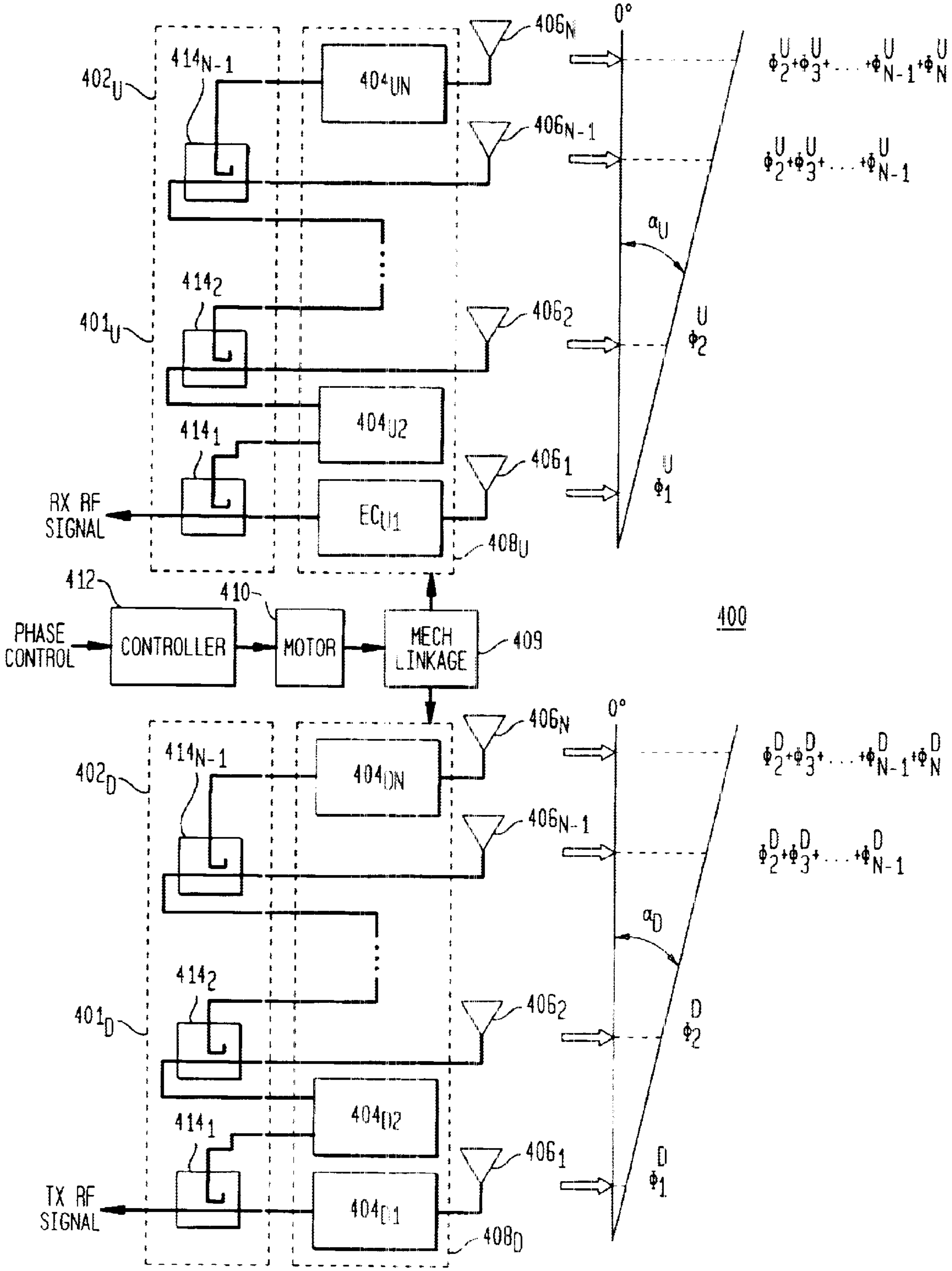
FIG. 4 shows a block diagram of an antenna system for a base station of a wireless communication network, according to one embodiment of the present invention.
Figure 5:
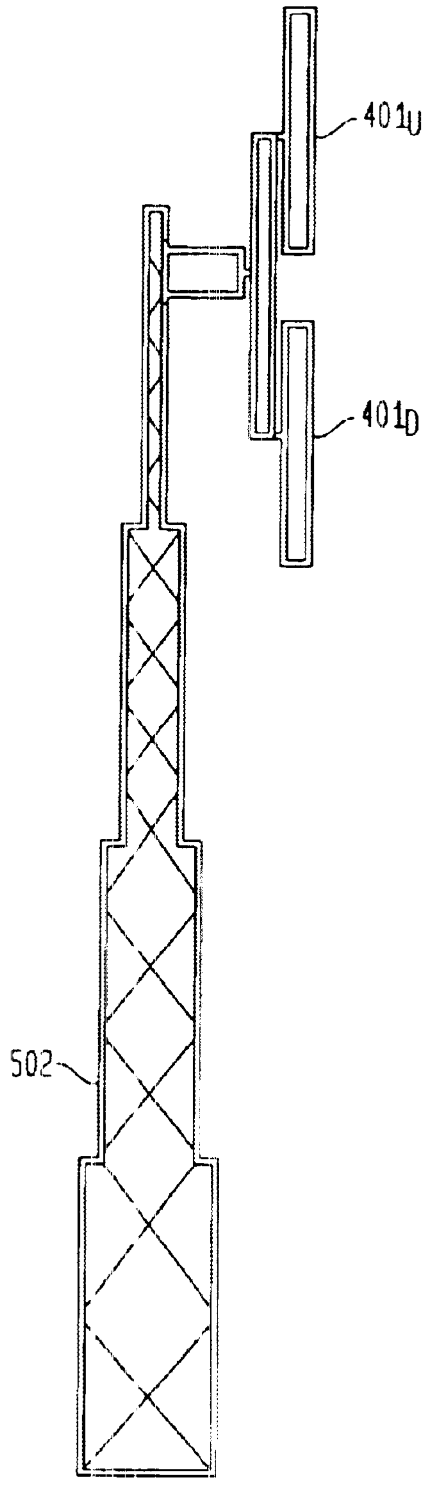
FIG. 5 shows a schematic diagram of a base station tower configured with the uplink and downlink antennas of the antenna system of FIG. 4.

FIG. 4 shows a block diagram of an antenna system 400 for a base station of a wireless communication network, according to one embodiment of the present invention. Antenna system 400 comprises two different N-element, series-fed, variable-phase, phased-array antennas: uplink antenna $\mathbf{401}_U$ configured to receive RF signals in the uplink frequency band from one or more wireless units, and downlink antenna $\mathbf{401}_D$ configured to transmit RF signals in the downlink frequency band to the same one or more wireless units. FIG. 5 shows a schematic diagram of a base station tower 502 configured with uplink antenna $\mathbf{401}_U$ and downlink antenna $\mathbf{401}_D$ of antenna system 400 of FIG. 4.

Figure 1:
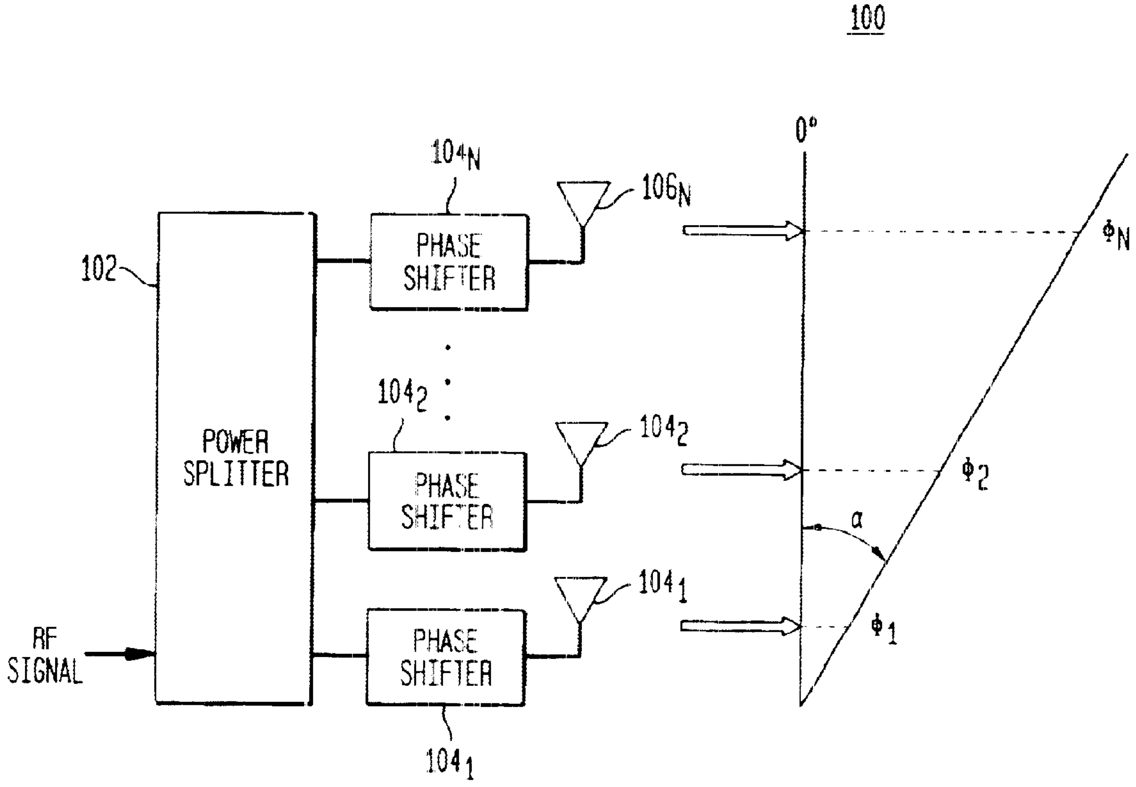
FIG. 1 (PRIOR ART)
FIG. 1 shows a block diagram of a conventional N-element, parallel-fed, fixed-phase, phased-array antenna.
Figure 2:
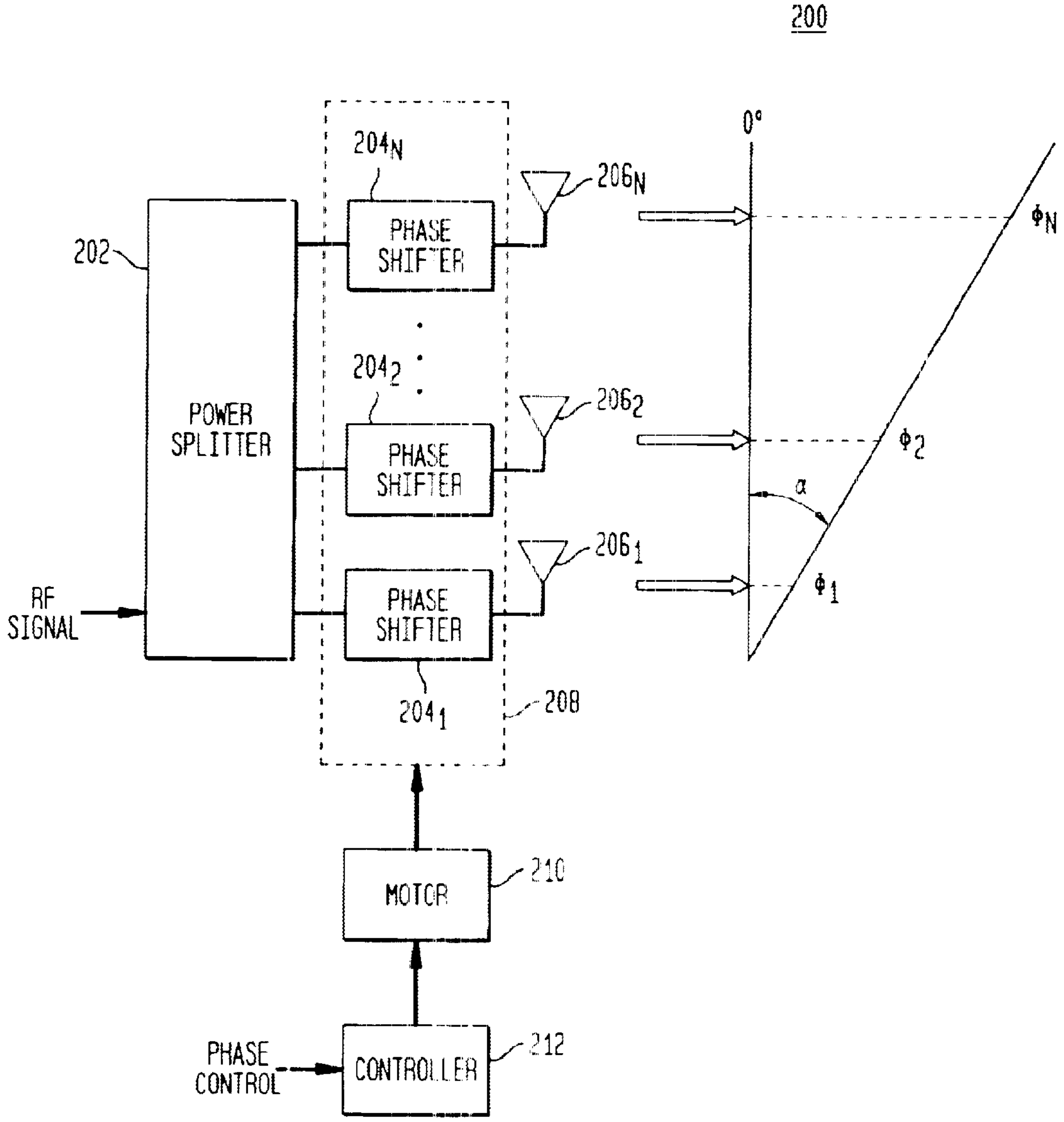
FIG. 2 (PRIOR ART)
FIG. 2 shows a block diagram of a conventional N-element, parallel-fed, variable-phase, phased-array antenna.
Figure 3:
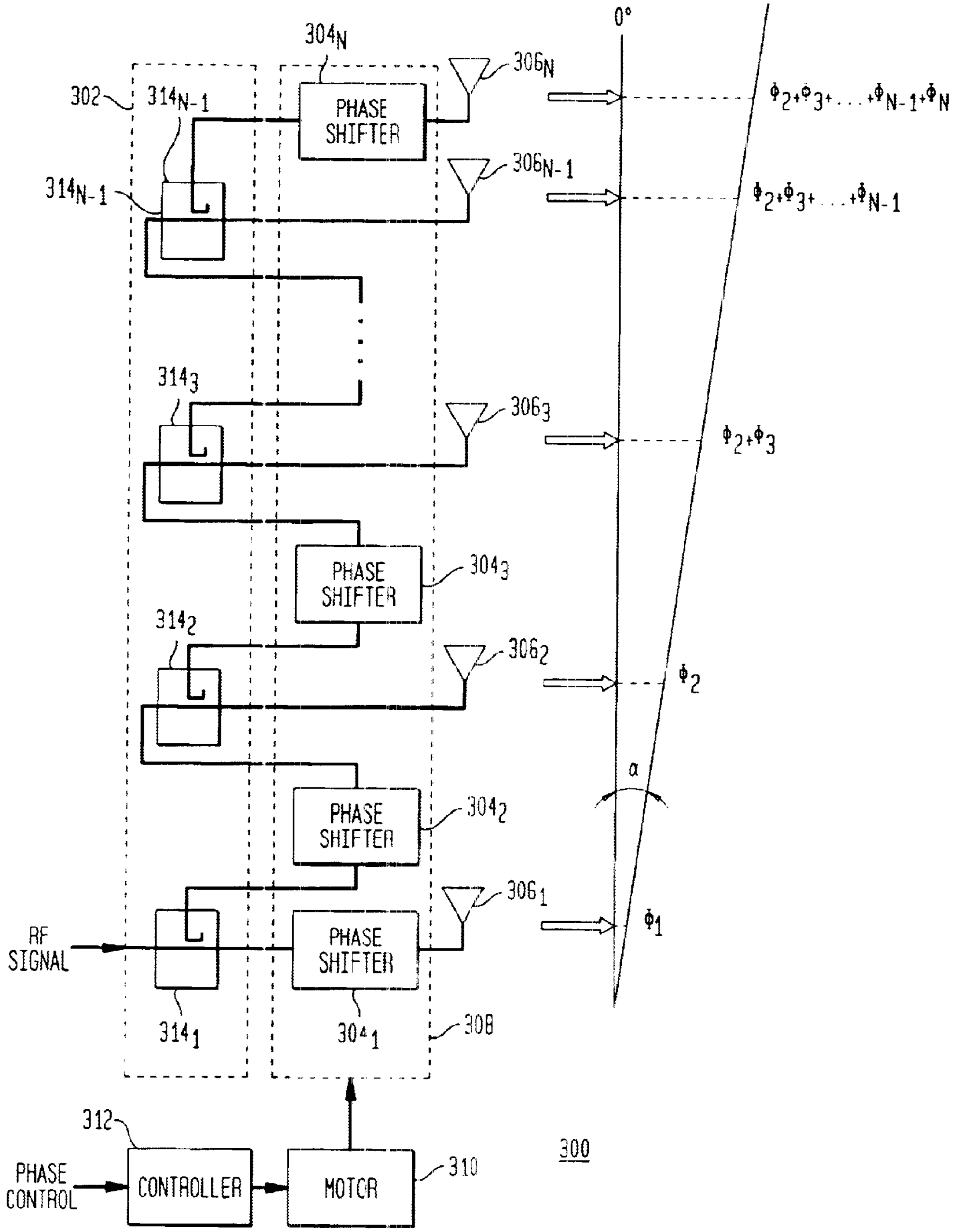
FIG. 3 (PRIOR ART)
FIG. 3 shows a block diagram of a conventional N-element, series-fed, variable-phase, phased-array antenna.

As shown in FIG. 4, each phased-array antenna in antenna system 400 has a power-splitter assembly 402 with N−1 couplers 414, a phase-shifter assembly 408 with N phase shifters 404, each phase shifter configured with a corresponding antenna element 406, where the N−1 couplers 414 are configured in series with the N phase shifters 404, analogous to that described for antenna 300 of FIG. 3. Note that, for uplink antenna $\mathbf{401}_U$, power-splitter assembly $\mathbf{402}_U$ functions as a "power-combiner" assembly.

In addition, antenna system 400 has a controller 412, which controls the rotational motion of a motor 410, which drives a mechanical linkage 409, which in turn is connected to drive the positions of movable components within both phase-shifter assemblies $\mathbf{408}_U$ and $\mathbf{408}_D$ to simultaneously change the downtilt angles for both the uplink and downlink antennas $\mathbf{401}_U$ and $\mathbf{401}_D$, respectively. Thus, a single electro-mechanical actuator (comprising controller 412, motor 410, and linkage 409) is used to control and coordinate changes in the downtilt angles for both the uplink and downlink antennas.

Because the uplink and downlink frequency bands are different in conventional wireless communication networks, the progressive phase shift needed to achieve a particular downtilt angle $\alpha_U$ for uplink antenna $\mathbf{401}_U$ will typically be different from the progressive phase shift needed to achieve the equivalent downtilt angle $\alpha_D$ for downlink antenna $\mathbf{401}_D$. This implies that the phase-shift angles $\phi$ applied by the various corresponding phase shifters 404 will differ between the upper and lower phase-shifter assemblies $\mathbf{408}_U$ and $\mathbf{408}_D$. For example, the phase-shift angle $\phi_2^U$ applied by the second phase-shifter $\mathbf{404}_{U2}$ in phase-shifter assembly $\mathbf{408}_U$ of uplink antenna $\mathbf{401}_U$ will typically be different from the phase-shift angle $\phi_2^D$ applied by corresponding phase shifter $\mathbf{404}_{D2}$ in phase-shifter assembly $\mathbf{408}_D$ of downlink antenna $\mathbf{401}_D$. (In a typical implementation where phase-shift angles $\phi_1^U$ and $\phi_1^D$ are both always zero, phase shifters $\mathbf{404}_{U1}$ and $\mathbf{404}_{D1}$ can both be omitted.)

In preferred embodiments of the present invention, the different progressive phase-shift values are taken into account when designing phase-shifter assemblies $\mathbf{408}_U$ and $\mathbf{408}_D$, such that motion of motor 410 is translated into equivalent changes in the two downtilt angles $\alpha_U$ and $\alpha_D$. In particular, the two phase-shift assemblies will typically have different geometries and/or different electrical characteristics to achieve the two different progressive phase shifts. Note that, in most embodiments, what is desired is that the uplink and downlink antennas have substantially the same downtilt angle so that they achieve the same footprints. This might enable the downtilt angle to be set efficiently based on only one set of measurements. For example, field testing could be limited to measurement of received signal strength throughout the cell for downlink transmission from the base station to a test mobile. Since the uplink and downlink downtilt angles will be known to be equivalent, actual test confirmation of adequate downlink coverage will imply that adequate uplink coverage is also achieved.

In alternative embodiments, for example, where the uplink and downlink antennas are mounted at substantially different heights on a base station tower or where different coverage patterns are desired, different downtilt angles may be needed for the uplink and downlink antennas to achieve the same antenna footprints. In such cases, the different required downtilt angles are taken into consideration when designing phase-shifter assemblies $\mathbf{408}_U$ and $\mathbf{408}_D$.

In preferred embodiments, linkage 409 is a rigid structure that is connected to motor 410 through one or more gear boxes that translate rotational motion of motor 410 into uniform translational motion of the movable components within both the uplink and downlink phase-shifter assemblies. Alternatively, the different progressive phase-shift values can also be taken into account when designing mechanical linkage 409, such that rotational motion of motor 410 is translated into non-uniform translational motion by linkage 409 for uplink antenna $\mathbf{401}_U$ and for downlink antenna $\mathbf{401}_D$.

Figure 6:
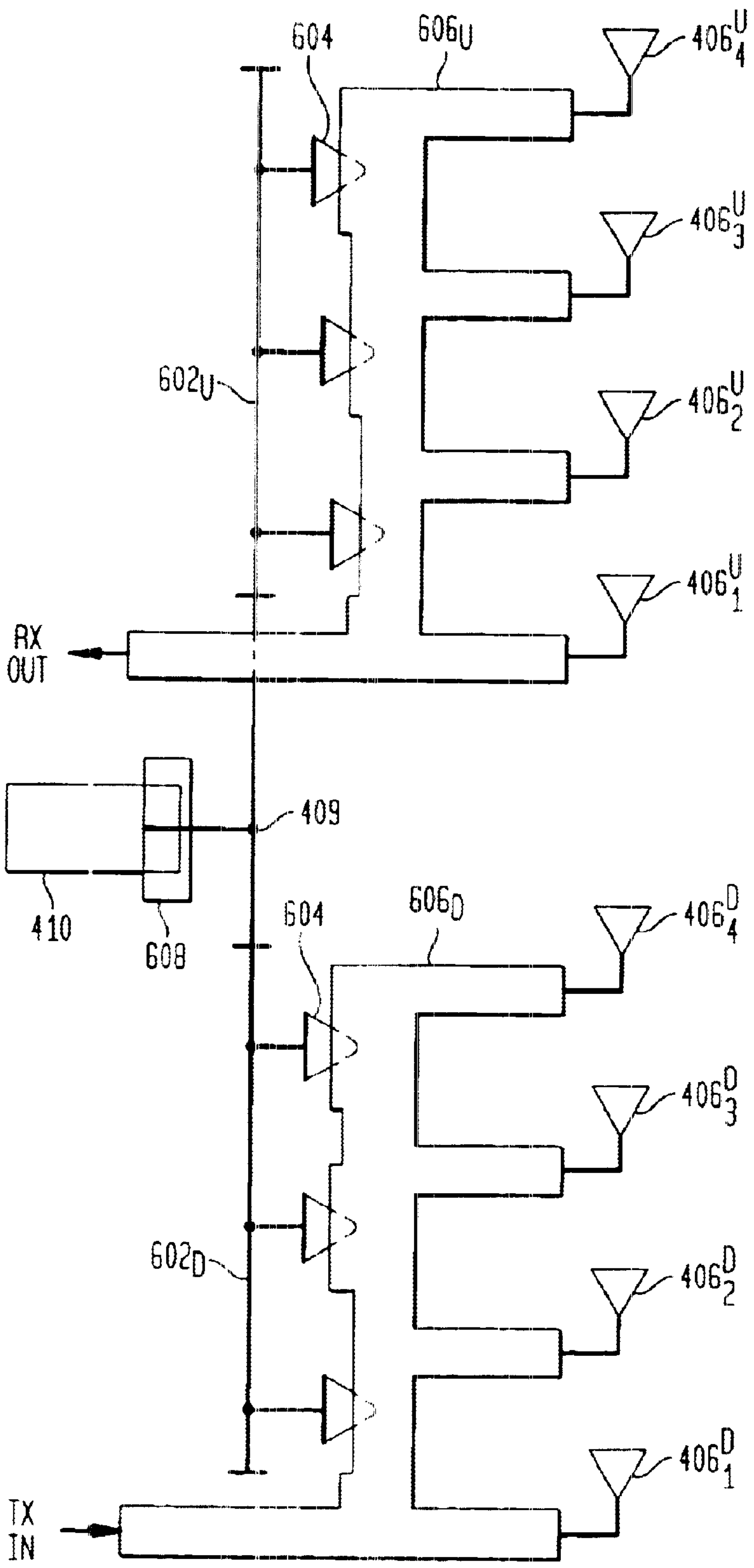
FIG. 6 shows a schematic diagram of an integrated uplink power-splitter/phase-shifter assembly for the uplink antenna of FIG. 4 and an integrated downlink power-splitter/phase-shifter assembly for the downlink antenna of FIG. 4 configured with a common linkage, according to one embodiment of the present invention in which each phased-array antenna has four antenna elements.

FIG. 6 shows a schematic diagram of an integrated uplink power-splitter/phase-shifter assembly $\mathbf{602}_U$ for uplink antenna $\mathbf{401}_U$ and an integrated downlink power-splitter/phase-shifter assembly $\mathbf{602}_D$ for downlink antenna $\mathbf{401}_D$ of FIG. 4 configured to a common linkage 409, according to one embodiment of the present invention in which each phased-array antenna has four antenna elements 406. Each integrated assembly 602 integrates the power-splitting functionality of one of the power-splitter assemblies 402 of FIG. 4 with the phase-shifting functionality of the corresponding phase-shifter assembly 408. Each integrated assembly 602 comprises a series of dielectric wedges 604 sandwiched between a microstrip conductor 606 and a lower, conducting, ground plane (not shown), where each dielectric wedge 604 is connected to linkage 409, which controls the "depth" of insertion of each dielectric wedge 604 between the corresponding microstrip conductor 606 and the ground plane.

Each integrated power-splitter/phase-shifter assembly shown in FIG. 6 is an air dielectric suspended microstrip line realized in sheet metal and based on a dielectric wedge, series-fed, phase-shifter assembly that is described in further detail in U.S. Pat. No. 5,940,030. Another suitable type of integrated power-splitter/phase-shifter assembly for the present invention is the sliding-short, reflection-mode, series-fed, phase-shifter assembly, which is another type of air dielectric suspended microstrip line realized in sheet metal and is described in U.S. patent application Nos. 09/148,442, filed on Sep. 4, 1998, and 09/148,449, filed on Sep. 4, 1998. Both of these two types of phase-shifter assemblies combine the N−1 couplers (i.e., 414 in FIG. 4) of a power-splitter assembly and the N phase-shifters (i.e., 404 in FIG. 4) of a phase-shifter assembly into a single integrated device that provides the functions of both power splitting (or combining) and series-fed phase shifting.

Uplink microstrip conductor $606_U$ is configured to receive the different RF signals received at the different antenna elements $406^U$ of uplink antenna $401_U$ from the wireless units and provide a phase-shifted, combined receive (RX) RF signal. Analogously, downlink microstrip conductor $606_D$ is configured to accept a transmit (TX) RF signal and provide differently phase-shifted RF signals to the various transmit antenna elements $406^D$ of downlink antenna $401_D$ for propagation to the wireless units. Impedance transformations due to line-width changes control the magnitude ratios for the power-splitting (or combining) function for the individual antenna array elements. Between successive antenna elements, a solid dielectric wedge 604 is introduced in place of the air, underneath the suspended conducting line. By altering the effective dielectric constant, the effective line length is changed, thereby changing the progressive phase shift between the successive antenna elements. The position (i.e., depth of insertion) of each dielectric wedge 604 between the corresponding microstrip conductor 606 and the ground plane determines the amount of dielectric material located between the microstrip conductor and the ground plane, which in turn determines the amount of phase shift applied to the RF signal at that location along the microstrip conductor. By controlling the depth of insertion (i.e., by controlling the motion of the wedges configured to linkage 409), the progressive phase shift and therefore the downtilt angle of the antenna can be controlled.

As represented in FIG. 6, rotational (or linear) motion of motor 410 (which is preferably a linear stepper motor) is translated into translational motion of linkage 409 by a suitable gear box 608. Translational motion of linkage 409 (i.e., left-to-right motion in FIG. 6) moves more of each dielectric wedge 604 (right in FIG. 6) between microstrip conductor 606 and the ground plane (and vice versa), thereby affecting the electromagnetic characteristics for signals propagating along microstrip conductor 606. In particular, moving dielectric wedges 604 changes the amount of phase shift applied to the RF signal as it propagates along microstrip conductor 606. By carefully selecting the thickness, size, shape (e.g., the taper of the wedges), and position of each dielectric wedge 604, as well as the size and shape of the corresponding microstrip conductor 606, the amount of phase shift applied by the various wedges and therefore the overall progressive phase shift of the integrated power-splitter/phase-shifter assembly can be accurately controlled for the entire range of motion of linkage 409. Note that in the exemplary embodiment of FIG. 6, the shapes of the upper and lower microstrip conductors $606_U$ and $606_D$ are different to take into account differences between the uplink and downlink frequency ranges. In alternative embodiments, the thicknesses, sizes, shapes, and positions of the dielectric wedges 604 may also vary from wedge to wedge and from antenna to antenna, either in addition to or instead of the differing shapes of the microstrip conductors 606.

Although FIG. 5 shows the uplink antenna $401_U$ configured above the downlink antenna $401_D$, it will be understood that the present invention can be implemented with alternative configurations, including those with the downlink antenna above the uplink antenna and those with the uplink and downlink antennas configured side-by-side. Moreover, although FIG. 4 shows uplink and downlink antennas $401_U$ and $401_D$ both with N antenna elements, it will be understood that the present invention can be implemented with uplink and downlink arrays having differing numbers of antenna elements.

Although the present invention has been described in the context of series-fed, variable-phase, phased-array antennas, it will be understood that the present invention could also be implemented for parallel-fed, variable-phase, phased-array antennas. Moreover, although the present invention has been described in the context of simultaneously controlling two variable-phase, phased-array antennas, one for transmitting downlink signals and one for receiving uplink signals, it will be understood that, in general, the present invention can be implemented to simultaneously control two or more variable-phase, phased-array antennas, where each different antenna may be differently used for transmitting only, receiving only, or both transmitting and receiving.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. An apparatus for simultaneously controlling downtilt angles of two or more arrays of antenna elements, comprising:

(a) for each array, a power splitter and a phase-shifter assembly configured to control the progressive phase shifts between successive elements in the array;

(b) a common linkage connected to one or more movable components of each phase-shifter assembly;

(c) a common motor configured to the linkage to convert motion of the common motor into motion of the linkage; and (d) a controller configured to control the motion of the common motor, wherein:

the motion of the common motor causes the motion of the linkage which simultaneously moves the one or more components within each phase-shifter assembly to change the progressive phase shifts between successive elements in the corresponding array, thereby simultaneously changing the downtilt angles of the two or more arrays in a coordinated fashion; and the apparatus simultaneously controls the downtilt angles of an uplink antenna and a downlink antenna for a base station of a wireless communication network.

2. The invention of claim 1, wherein the common motor is a linear stepper common motor configured with one or more gear boxes to translate the motion of the common motor into the motion of the linkage.

3. The invention of claim 1, wherein the movable components of each phase-shifter assembly are dielectric wedges that move between a conductor and a ground plane to change the amount of phase shift applied to signals propagating along the conductor, which is in turn connected to the antenna elements of the corresponding array.

4. The invention of claim 1, wherein the power splitter and the phase-shifter assembly are implemented as an integrated, series-fed, power-splitter/phase-shifter assembly.

5. The invention of claim 1, wherein the phase-shifter assemblies for the two or more arrays have different designs to account for differences in frequency range between the two or more arrays.

6. The invention of claim 1, wherein:

the common motor is a linear stepper common motor configured with one or more gear boxes to translate the motion of the common motor into the motion of the linkage;

the movable components of each phase-shifter assembly are dielectric wedges that move between a conductor and a ground plane to change the amount of phase shift applied to signals propagating along the conductor, which is in turn connected to the antenna elements of the corresponding array;

the phase-shifter assemblies for the two or more arrays have different designs to account for differences in frequency range between the two or more arrays; and the power splitter and the phase-shifter assembly are implemented as an integrated, series-fed, power-splitter/phase-shifter assembly.

7. An antenna system for a base station of a wireless communication network, comprising:

(a) an uplink array of antenna elements;

(b) a downlink array of antenna elements;

(c) an uplink power-combiner and an uplink phase-shifter assembly configured to control progressive phase shifts between successive array elements in the uplink array;

(d) a downlink power-splitter and a downlink phase-shifter assembly configured to control progressive phase shifts between successive array elements in the downlink array;

(e) a common linkage connected to one or more movable components of both the uplink and downlink phase-shifter assemblies;

(f) a common motor configured to the linkage to convert motion of the common motor into motion of the linkage; and (g) a controller configured to control the motion of the common motor, wherein:

the motion of the common motor causes the motion of the linkage which simultaneously moves the one or more components within the uplink and downlink power-splitter/phase-shifter assemblies to simultaneously change the progressive phase shifts between successive elements in the uplink and downlink arrays, thereby simultaneously changing the downtilt angles of the uplink and downlink arrays in a coordinated fashion.

8. The invention of claim 7, wherein the common motor is a linear stepper common motor configured with one or more gear boxes to translate the motion of the common motor into the motion of the linkage.

9. The invention of claim 7, wherein the movable components of each phase-shifter assembly are dielectric wedges that move between a conductor and a ground plane to change the amount of phase shift applied to signals propagating along the conductor, which is in turn connected to the antenna elements of the corresponding array.

10. The invention of claim 7, wherein the power splitter and the phase-shifter assembly are implemented as an integrated, series-fed, power-splitter/phase-shifter assembly.

11. The invention of claim 7, wherein the phase-shifter assemblies for the two or more arrays have different designs to account for differences in frequency range between the two or more arrays.

12. The invention of claim 7, wherein:

the common motor is a linear stepper common motor configured with one or more gear boxes to translate the motion of the common motor into the motion of the linkage;

the movable components of each phase-shifter assembly are dielectric wedges that move between a conductor and a ground plane to change the amount of phase shift applied to signals propagating along the conductor, which is in turn connected to the antenna elements of the corresponding array;

the phase-shifter assemblies for the two or more arrays have different designs to account for differences in frequency range between the two or more arrays; and the power splitter and the phase-shifter assembly are implemented as an integrated, series-fed, power-splitter/phase-shifter assembly.

13. An apparatus for simultaneously controlling downtilt angles of two or more arrays of antenna elements, comprising:

(a) for each array, a power splitter and a phase-shifter assembly configured to control the progressive phase shifts between successive elements in the array;

(b) a common linkage connected to one or more movable components of each phase-shifter assembly;

(c) a common motor configured to the linkage to convert motion of the common motor into motion of the linkage; and (d) a controller configured to control the motion of the common motor, wherein:

the motion of the common motor causes the motion of the linkage which simultaneously moves the one or more components within each phase-shifter assembly to change the progressive phase shifts between successive elements in the corresponding array, thereby simultaneously changing the downtilt angles of the two or more arrays in a coordinated fashion; and the phase-shifter assemblies for the two or more arrays have different designs to account for differences in frequency range between the two or more arrays.

* * * * *